United States Patent [19]

Kawamura

[11] Patent Number: 5,588,080
[45] Date of Patent: Dec. 24, 1996

[54] CONNECTOR FOR CONNECTING AN OPTICAL FIBER CABLE

[75] Inventor: Shigeto Kawamura, Yokkaichi, Japan

[73] Assignee: Sumitomo Wiring Systems, Ltd., Japan

[21] Appl. No.: 445,354

[22] Filed: May 19, 1995

[30] Foreign Application Priority Data

May 25, 1994 [JP] Japan ................................. 6-111170

[51] Int. Cl.⁶ ...................................................... G02B 6/38
[52] U.S. Cl. ................................... 385/78; 385/72
[58] Field of Search .................. 385/72, 78, 85

[56] References Cited

U.S. PATENT DOCUMENTS

| 4,936,626 | 6/1990 | Griffin | 350/96.2 |
| 4,936,662 | 6/1990 | Griffin | 350/96.2 |
| 4,986,625 | 1/1991 | Yamada et al. | 350/96.2 |

FOREIGN PATENT DOCUMENTS

| 60-82605 | 6/1985 | Japan . |
| 418804 | 2/1992 | Japan . |

Primary Examiner—John D. Lee
Assistant Examiner—Phan T. H. Palmer
Attorney, Agent, or Firm—Anthony J. Casella; Gerald E. Hespos

[57] ABSTRACT

A cable side connector for connecting an optical fiber cable, which is partially usable as of both full lock type and friction type and does not cause a variation in optical coupling in either case, includes a housing 10 and a fixing member 20 which is securely accommodated in the housing 10. The fixing member 20 is formed with locking arms 25 which engage engaging projections of a module side connector when the cable side connector is coupled with the module side connector or the housing is formed with a friction lock projection. This connector can be used as of full lock type and of friction type only by replacing the fixing member. Further, since the housing 10 is used commonly for the both types, displacement of the ferrule which is required to have accuracy can be prevented.

8 Claims, 6 Drawing Sheets

CONNECTOR FOR CONNECTING AN OPTICAL FIBER CABLE

BACKGROUND OF THE INVENTION

1. Field of the Invention

The present invention relates to a connector for connecting an optical fiber cable and a photoelectric device or for connecting optical fiber cables.

2. Description of the Prior Art

When, for example, a photoelectric device and an optical fiber cable are connected, it is a general practice that a module side connector is mounted on the photoelectric device and a cable side connector is mounted on the optical fiber cable. The photoelectric device and the optical fiber cable are connected by coupling these connectors.

In this case, there are two types of locking mechanisms for locking the coupled state of the connectors: friction lock type and full lock type.

The friction lock type is such that a projection is, for example, formed on the outer surface of the cable side connector. When the cable side connector is fitted and coupled with the module side connector, this projection presses the module side connector and the coupled state of these connectors is readily secured with a frictional force.

On the other hand, the full lock type is such that the cable side connector is provided, for example, with a locking claw and the module side connector is formed with an engaging portion engageable with the locking claw. The coupled state of the connectors is strongly secured by engagement of the locking claw with the engaging portion.

As shown in FIGS. 12(a) and 12(b), a cable side connector 50 of full lock type normally includes a housing 51 formed unitarily with a ferrule 51a for positioning an optical fiber cable A and a fixing member 52 which is fitted to the housing 51 to secure the optical fiber cable A inserted into the ferrule 51a. In general, locking arms 53 are mounted on the housing 51.

There are prepared two types of housings 51: a full lock type housing with the locking arms and a friction lock type connector housing without the locking arms. The fixing member 52 which is fitted in the housing 51 is made commonly usable for connectors of both full lock type and friction lock type. Thus, the connector 50 can be used as of both types.

If the housing 51 unitarily-formed with the ferrule 51a takes separate forms depending upon whether the connector 50 is of full lock type or of friction lock type, different molds are naturally used to fabricate the different housings 51. Accordingly, the common parts of the connector housings of both types cannot be formed perfectly identically. On the other hand, if there is a variation in the shape of the ferrule 51a which is particularly required to have accuracy, this leads to displacement of an optical axis when the cable side connector is coupled with the module side connector as a mating connector, resulting in a variation in optical coupling.

In view of the above problem, it is an object of the invention to provide a connector for connecting an optical fiber cable which is partially usable as of both full lock type and friction type and does not cause a variation in optical coupling in either case.

SUMMARY OF THE INVENTION

According to the invention, since the locking arms are mounted on the fixing member, the connector can also be used as of friction type by replacing the fixing member with the one without the locking arms. At this time, as the housing to be coupled with the mating connector is commonly used for the both types, the ferrule is not displaced relative to the mating connector in either case where the connector is used as of full lock type or of friction type.

Preferably, when the optical fiber cable having the exposed leading end where the sheath was peeled off is inserted into the insertion hole formed in the holding plate of the fixing member, the core and the sheath of the optical fiber cable are retained by the retainers, respectively. When this fixing member is fitted in the housing, the retainers are smoothly introduced to the pressing portion through the receptacle because of the presence of the tapered face formed at the stepped portion of the housing. The retainers are pressed inward in the pressing portion, and thereby the projections formed at the leading ends of the retainers come into pressing contact with the core and the sheath of the optical fiber cable. As a result, the optical fiber cable is secured by the fixing member and the fixing member is secured in the housing. At this stage, the locking portions of the fixing member are engaged with the engaging portions of the housing, thereby preventing the fixing member from getting out of the housing. When the thus assembled connector is coupled with the mating connector, the locking claws of the locking arms mounted on the fixing member are engaged with the engaging portions of the mating connector, thereby locking the coupling of the connectors.

Further, when the connector is coupled with the mating connector, the locking claws formed at the leading ends of the second arms come into contact with the engaging portions of the mating connector and are moved forward while undergoing deflection. The locking claws are returned to their original shape after moving over the engaging portions and are engaged therewith, with the result that the coupling of the connectors is locked. The locked state is released as follows. When the rear ends of the first arms are pressed inward, the leading ends of the second arms move wider open, thereby releasing engagement of the locking claws with the engaging portions of the mating connector.

When the optical fiber having an exposed leading end is inserted through the insertion hole of the holding plate, the end face of the insulation of the optical fiber comes into contact with the contact portion of the retainer for retaining the core of the optical fiber cable. As a result, the optical fiber cable is positioned relative to the fixing member.

BRIEF DESCRIPTION OF THE DRAWINGS

These and other objects, features and advantages of the present invention will become more apparent upon a reading of the following detailed description and accompanying drawings in which.

DETAILED DESCRIPTION OF THE PREFERRED EMBODIMENTS

Figure 1:
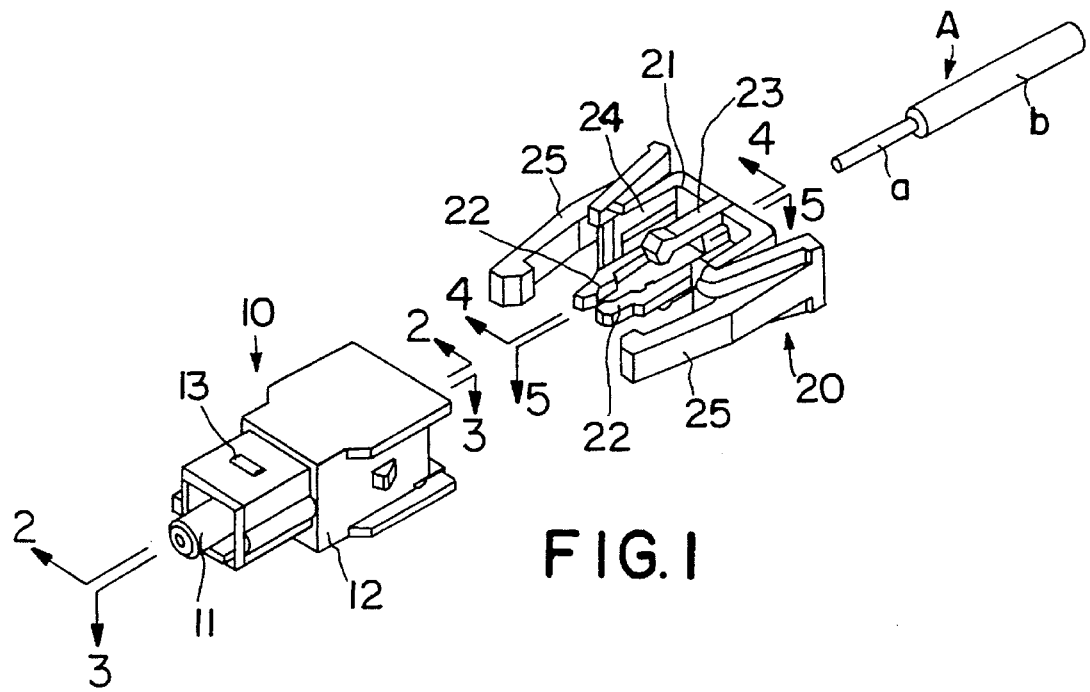
FIG. 1 is an exploded perspective view of a cable side connector of one embodiment according to the invention.

Hereafter, one embodiment of the invention is described with reference to the accompanying drawings. As shown in FIG. 1, a connector for connecting an optical fiber cable is of full lock type which is securely coupled with a module side connector 30 (see FIG. 10) connected with a photoelectric device by means of locking arms. This cable side connector includes a housing 10 and a fixing member 20 securely mounted in the housing 10.

Figure 4:
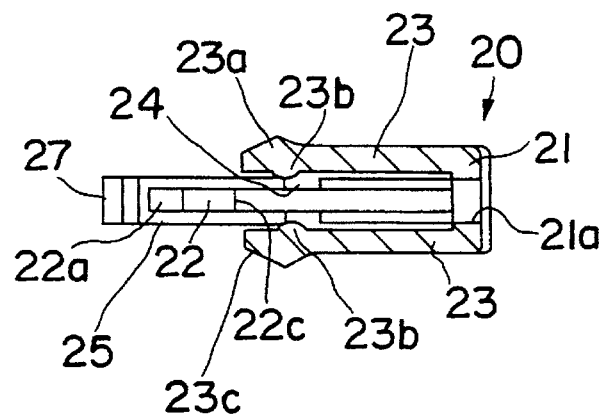
FIG. 4 is a section along line X—X of FIG. 1.
Figure 5:
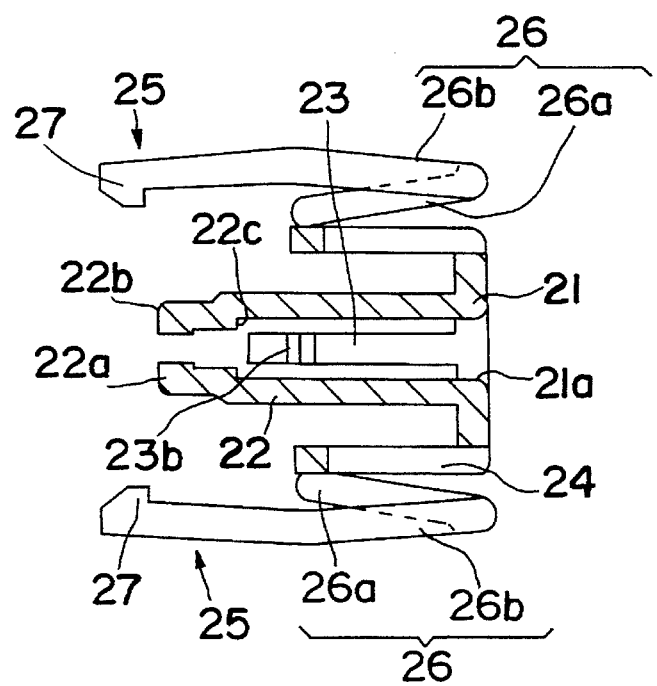
FIG. 5 is a section along line Y—Y of FIG. 1.
Figure 6:
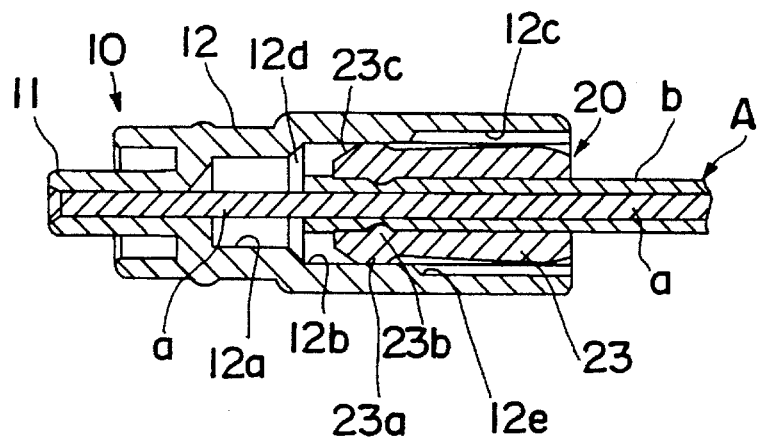
FIG. 6 is a section along line T—T of FIG. 9.
Figure 7:
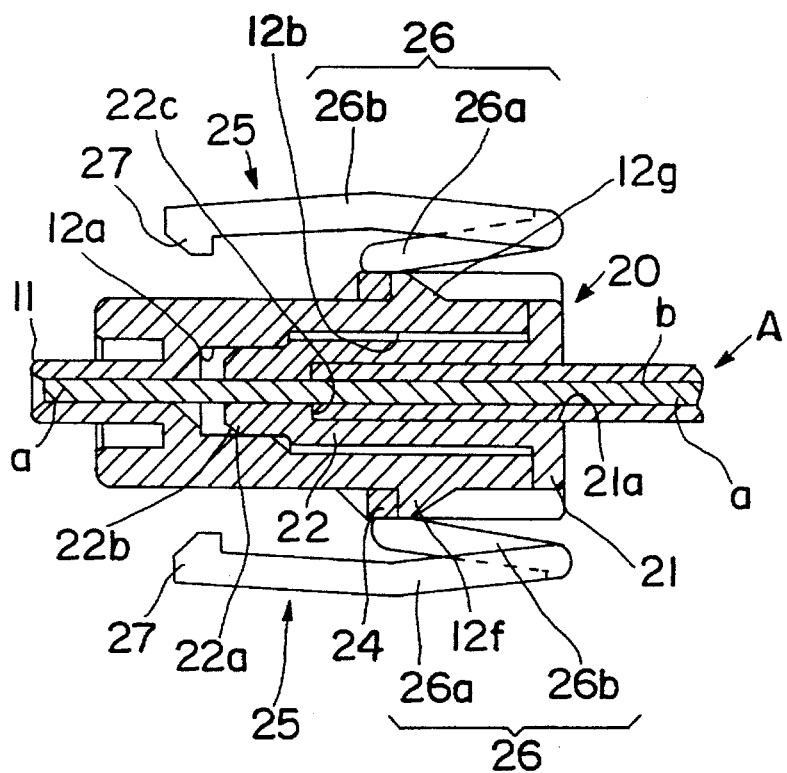
FIG. 7 is a section along line U—U of FIG. 9.

The fixing member 20 is of synthetic resin and, as shown in FIGS. 4 and 5, includes a holding plate 21 formed with an insertion hole 21a through which an optical fiber cable A is inserted, a pair of flexible core retainers 22 formed on the holding plate 21, a pair of sheath retainers 23, and locking portions 24, and locking arms 25.

As shown in FIGS. 4 and 5, the pair of core retainers 22 are opposed to each other with the insertion hole 21a of the holding plate 21 therebetween and project forward so as to extend along the optical fiber cable A inserted through the insertion hole 21a. Each core retainer 22 is formed at the inner surface of its leading end with a projection 22a for pressing a core a of the optical fiber cable A where a sheath b is peeled off and at the outer corner portion of its leading end with a tapered face 22b. A distance between the projections 22a is set equal to or larger than an outside diameter of the core a by about 0.1 mm.

Further, as shown in FIG. 5, each retainer 22 is formed with a stepped portion 22c in a position more forward (to the left in FIGS. 4 and 5) than the retainer 23. The end face of the sheath b of the optical fiber cable A inserted into the hole 21a comes into contact with the stepped portions 22c, thereby being positioned.

Similar to the core retainers 22, as shown in FIGS. 4 and 5, the pair of sheath retainers 23 are opposed to each other with the insertion hole 21a of the holding plate 21 therebetween, but the positions thereof are displaced by 90° from those of the core retainers 22 with respect to the insertion hole 21a. Each retainer 23 is formed with a projection 23a engageable with an insertion groove 12c formed in the housing 10 and a projection 23b for pressing the sheath b of the optical fiber cable A at the inner and outer surfaces of its leading end, respectively. A tapered face 23c which tapers toward the leading end of the retainer 23 is formed on the projection 23a on the outer surface. A distance between the projections 23b is set equal to or larger than an outside diameter of the sheath b by about 0.1 mm. Since the retainers 23 are adapted to retain the sheath b of the optical fiber cable A, they are located more backward than the core retainers 22. Thus, the length of the retainers 23 is shorter than that of the retainers 22.

Figure 8A:
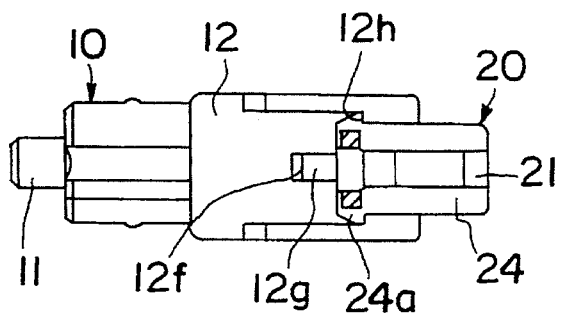
FIGS. 8(a) and 8(b) are diagrams showing the connector in its partially locked state.

As shown in FIGS. 5 and 8(a), the locking portions 24 are U-shaped with bent leading ends, and project forward from the opposite sides of the holding plate 21. Projections 24a engageable with a stepped portion 12h of the housing 10 to be described later are formed at the opposite sides of the leading end of each locking portion 24 (see FIG. 8(a)).

As shown in FIGS. 1 and 5, each locking arm 25 includes an arm main body 26 connected with the corresponding locking portion 24 and a locking claw 27 formed at the leading end of the arm main body 26.

Each arm main body 26 includes a first arm 26a one end of which is connected with the outer surface of the leading end of the corresponding locking portion 24 and which extends obliquely outward along the locking portion 24 to a position adjacent the holding plate 21, and a second arm 26b which is bent outward and extends forward from the other end of the first arm 26a. The second arm 26b is bent inward in its intermediate position. The locking claw 27 is formed on the inner surface of the leading end of each second arm 26b. Accordingly, when the rear ends of the second arms 26b are pressed inward, the first arms 26a are deflected inward, with the result that the leading ends of the second arms 26b are move outward apart from each other.

Figure 2:
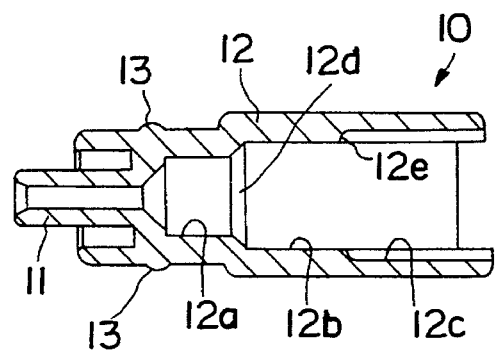
FIG. 2 is a section along line V—V of FIG.
Figure 3:
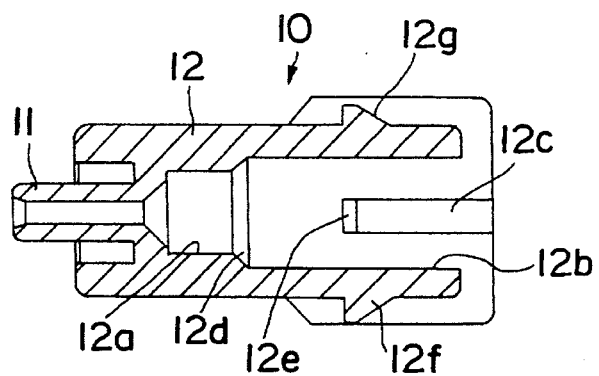
FIG. 3 is a section along line W—W of FIG. 1.

As shown in FIGS. 1 to 3, the housing 10 includes a ferrule 11 into which the core a of the optical fiber cable A from which the sheath b is peeled off is inserted and which positions the optical fiber cable A and a housing main body 12 for accommodating the fixing member 20 retaining the optical fiber cable. The ferrule 11 and the housing main body 12 are unitarily formed of synthetic resin, similar to the fixing member 20. Projections 13 are formed on the outer surface of the leading end of the housing main body 12. When the cable side connector is inserted into a receptacle 31 formed in the module side connector 30 as a mating connector shown in FIG. 10, the projections 13 press the surface of the receptacle 31 to readily secure the coupling state of the connectors with its frictional force. Particularly, the surface of the receptacle is provided with projections 33 which correspond to the projections 13 of the cable side connector.

The housing main body 12 includes a first receptacle 12a which acts to press the core retainers 22, and a second receptacle 12b which is larger than the first receptacle 12a, acts to press the sheath retainers 23 and facilitate insertion of the core retainers 22. The second receptacle 12b is formed with the insertion grooves 12c with which the projections 23a are engaged to guide insertion of the sheath retainers 23. Tapered faces 12d and 12e which taper toward the leading end of the housing main body 12 are formed at stepped portions between the second receptacle 12b and the first receptacle 12a and between the leading end of the insertion grooves 12 and the second receptacle 12b, respectively.

On the outer surface of the housing main body 12, there are formed projections 12f engageable with the locking portions 24 of the fixing member 20. A tapered face 12g which tapers toward the rear end of the housing main body 12 is formed on each projection 12f. Stepped portions 12h engageable with the projections 24a are formed behind the projections 12f (see FIG. 8(a)).

Figure 8B:
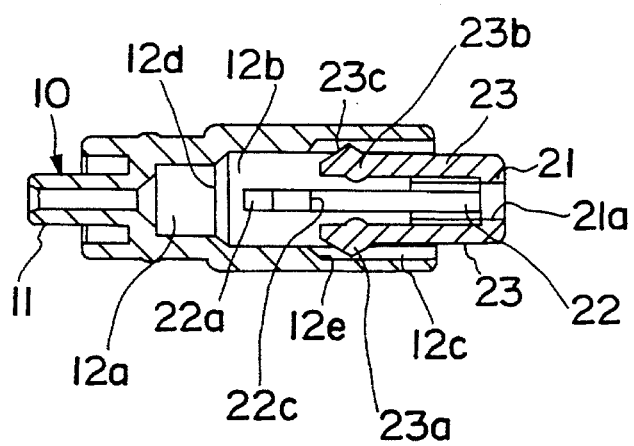

Engagement of the projections 24a with the stepped portions 12h as shown in FIG. 8(a) prevents the fixing member 20 from getting out of the housing main body 12. In this way, the fixing member 20 is partially locked in the housing main body 12. At this stage, the projections 23a of the retainers 23 are loosely fitted in the insertion groove 12c of the housing main body 12 and the retainers 22 are loosely received within the second receptacle 12b. Thus, the second receptacle 12b and the insertion groove 12c form a receptacle for loosely receiving the retainers 22 and 23 as shown in FIG. 8(b). The optical fiber cable A can be set in the fixing member 10 by inserting the optical fiber cable A through the insertion hole 21a of the holding plate 21. In the partially locked position, the optical fiber cable A can be easily inserted since the distance between the projections 22a and the distance between the projections 23b are, as described above, equal to or slightly larger than the outside diameter of the core a and the outside diameter of the sheath b, respectively.

The optical fiber cable A is attached to the cable side connector assembled as described above as follows. The optical fiber cable A having the leading end where the sheath b is peeled off is inserted through the insertion hole 21a of the fixing member 20 partially locked in the housing 10 as shown in FIGS. 8(a) and 8(b), such that the core a and the sheath b are retained by the retainers 22 and 23, respectively. In this position, the coating b abuts the stepped portions 22c of the core retainers 22. When the fixing member 20 is pressed forward with the projections 23a fitted in the insertion grooves 12c, the leading ends of the retainers 22 and 23 smoothly enter the first and second receptacles 12a and 12b because of the presence of the tapered surfaces 22b, 12d and 23c, 12e, respectively, with the result that the retainers 22 and 23 are pressed inward. At this time, since the outward deflection of the retainers 22 is restricted by the first receptacle 12a of the housing main body 12, the end face of the sheath b will not get disengaged from the stepped portions 22c even if the fixing member 20 is inserted with a strong force. Thus, the optical fiber cable A can be securely positioned and the retainers 22 are not damaged.

Figure 9:
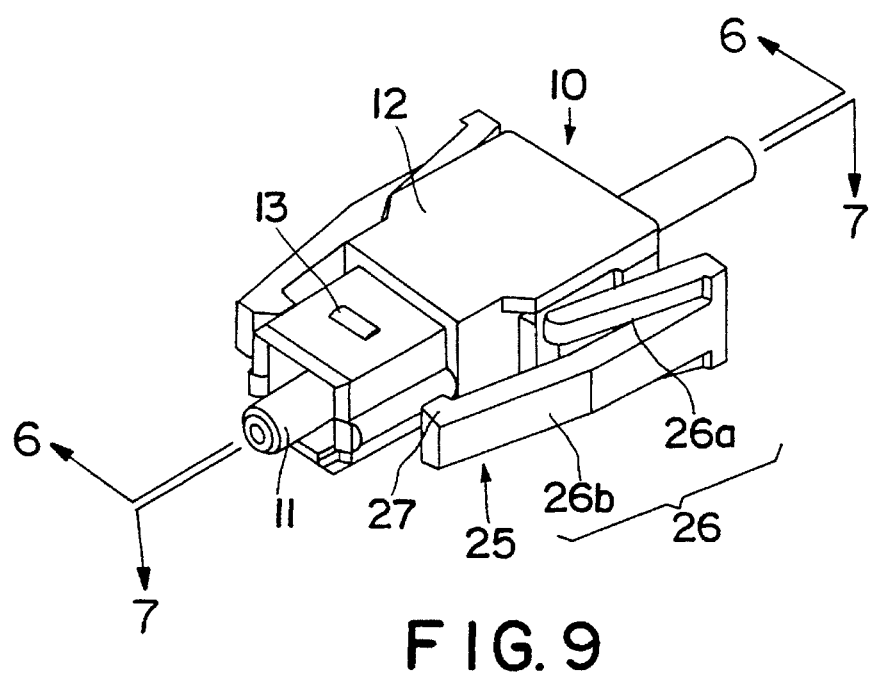
FIG. 9 is a perspective view of the connector in its fully assembled state.

As a result, the first receptacle 12a and the second receptacle 12b act as pressing portions for pressing the projections 22b and 23b against the core a and the sheath b of the optical fiber cable A, respectively, and the optical fiber cable A is secured by the fixing member 20. Simultaneously, the locking portions 24 are smoothly engaged with the projections 12f because of the presence of the tapered faces 12g, and thereby the fixing member 20 is secured to the housing main body 12 as shown in FIG. 9.

Figure 10:
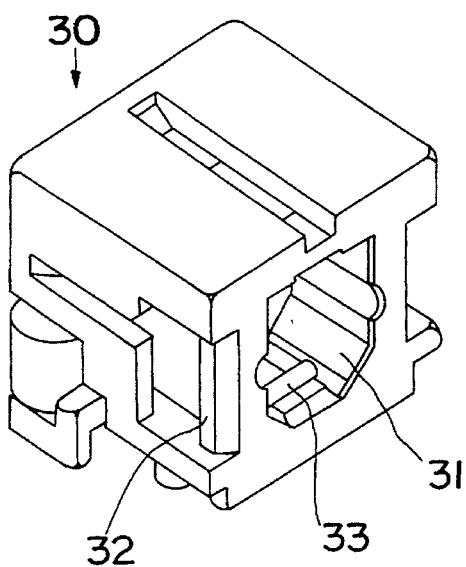
FIG. 10 is a perspective view of a module side connector as a male connector.

When the leading end of the cable side connector thus assembled is inserted into the receptacle 31 of the module side connector 30 as a mating connector shown in FIG. 10, the projections 13 formed on the housing 10 press the inner wall of the receptacle 31, thereby readily securing the connectors with its frictional force. Simultaneously, the locking claws 27 of the locking arms 25 formed at the fixing member 20 are engaged with engaging projections 32 of the module side connector 30, thereby strongly coupling the connectors. At this time, the projections 13, cooperating with the corresponding projections 33 of the surface of the receptacle, act as springs to constantly press the ferrule 11 forward.

The cable side connector in its coupled state is detached from the module side connector 30 as follows. When the rear ends of the second arms 26b of the locking arms 25 are pressed inward, the leading ends of the second arms 26b move wider open, thereby disengaging the locking claws 27 from the engaging projections 32. In this way, the connectors can be easily detached.

Figure 11:
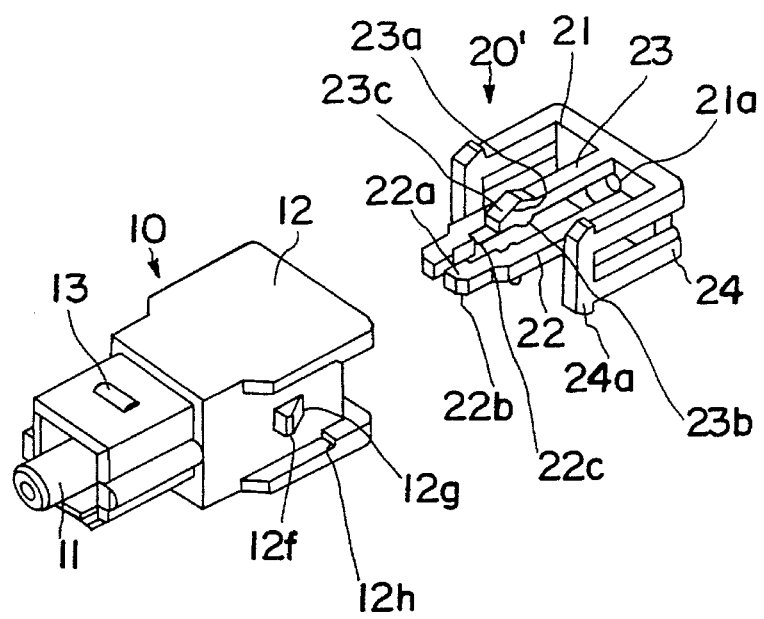
FIG. 11 is an exploded perspective view of the connector when it is used of friction type.
Figure 12A:
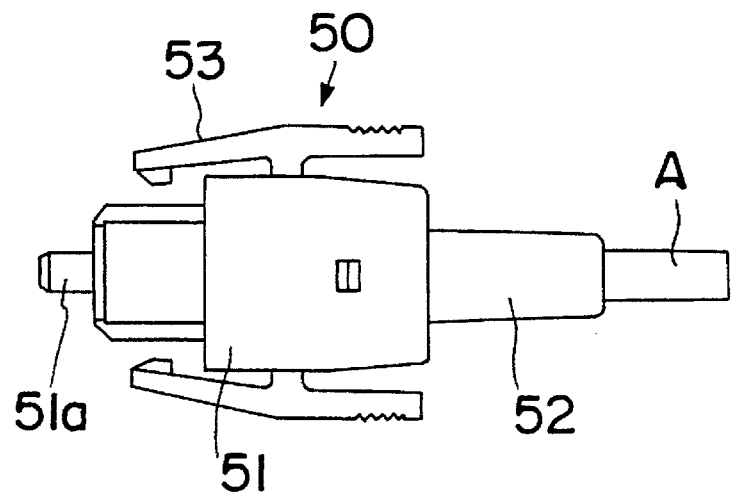
FIGS. 12(a) and 12(b) are exploded perspective views of a prior art connector.
Figure 12B:
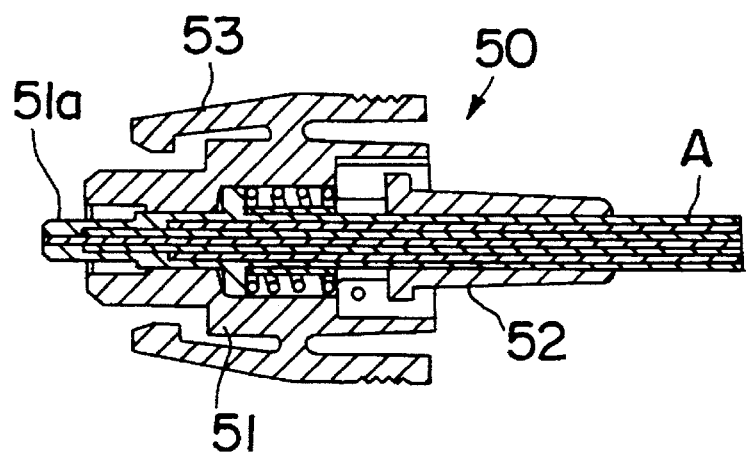

If a fixing member 20' without locking arms as shown in FIG. 11 (the fixing member 20' has the structure identical to the fixing member 20 except that it has no locking arms, and therefore like elements are identified by like reference numerals) is used instead of the fixing member 20, the cable side connector can be used as of friction type which is readily coupled with the module side connector only by means of the projections 13. Since the housing 10 is commonly used for the both types, the ferrule 11 is not displaced relative to the module side connector, thus causing no variation in optical coupling of the photoelectric devices with the optical fiber cables A.

Although the invention is described with respect to the cable side connector to be coupled with the module side connector in the foregoing embodiment, its application is not limited to this. For example, the invention can also be applied to connectors for connecting the optical fiber cables.

As described above, in an inventive connector for connecting an optical fiber cable, friction lock projections are formed on a housing unitarily formed with a ferrule and locking arms are mounted on a fixing member. Accordingly, by selectively using the fixing member with the locking arms and the one without the locking arms, this connector can be used both as of full lock type and as of friction type. Particularly, since the housing is commonly used in either case, the ferrule is not displaced relative to a mating connector, thereby suppressing a variation in optical coupling of the optical fiber cables and light emitting devices or optical coupling of the optical fiber cables.

Further, the optical fiber cable can be retained by retainers formed at the fixing member, and the retainers are pressed inward upon accommodating the fixing member in the housing, with the result that the optical fiber cable is strongly retained. Further, the fixing member can be smoothly inserted into the housing because of the presence of tapered faces. Thus, the optical fiber cable can be easily secured in the connector, thereby considerably improving operability.

If each retainer for retaining a core of the optical fiber cable is formed with a contact portion with which the end face of an insulation of the optical fiber cable comes into contact, it is very convenient because the optical fiber cable is automatically positioned when the optical fiber cable is placed in the fixing member.

What is claimed is:

1. A connector for connecting an optical fiber (A) having a core (a) and a sheath (b), said optical fiber (A) having a mating end, said core (a) protecting axially beyond said sheath (b) at said mating end, said connector comprising a housing (10) unitarily formed with a ferrule (11), and a fixing member (20) comprising a holding plate (21) formed with an insertion hole (21a) through which the optical fiber cable (A) is inserted, flexible core retainers (22) extending forward from the holding plate (21) and having projections (22a) formed on a leading end thereof for pressing the core (a) of the optical fiber cable (A), flexible sheath retainers (23) extending forward from the holding plate (21) and having projections (23b) formed on a leading end thereof for pressing the sheath (b) of the optical fiber cable (A), and locking portions (24) for locking the fixing member (20) with the housing (10), wherein, for coupling the connector with a mating connector (30), coupling structure is provided on the connector, said coupling structure comprising at least one of locking arms (25) formed on the fixing member (20) for engaging portions (32) formed on the mating connector (30) and a friction lock projection (13) formed on the housing (10) for pressing the mating connector (30).

2. A connector according to claim 1, wherein the housing (10) is formed with a receptacle (12b, 12c) for loosely receiving the retainers (22, 23) formed at the leading end of the fixing member (20), and a pressing portion (12a, 12b) formed contiguous with the receptacle (12b, 12c) for pressing the retainers (22, 23) against the optical fiber cable (A).

3. A connector according to claim 2, wherein a tapered face (22b, 23c, 12d, 12e) is formed on at least one of the outer sides of the leading ends of the retainers (22, 23) and stepped portions between the receptacle (12b, 12c) and the pressing portion (12a, 12b) of the housing (10).

4. A connector according to claim 3, wherein the locking portions (24) are engaged with engaging portions (12f) formed on the housing (10) to lock the fixing member (20) when the retainers (22, 23) are positioned at the receptacle (12b, 12c) and the pressing portion (12a, 12b) of the housing (10), respectively.

5. A connector according to claim 4, wherein each arm main body (26) comprises a first arm (26a) which extends backward from the leading end of the corresponding locking portion (24) toward the holding plate (21) of the fixing member (20) along the locking portion (24) and a second arm (26b) which is bent at the rear end of the first arm (26a) and extends forward, and the locking claw (27) is formed at the leading end of each second arm (26b).

6. A connector according to claim 5, wherein the retainer (22) for retaining the core (a) of the optical fiber cable (A) is formed with a contact portion (22c) with which the end face of the sheath (b) of the optical fiber (A) comes into contact.

7. A connector according to claim 1, wherein each of the locking arms (25) comprises a flexible arm main body (26) connected with the leading end of each locking portion (24), and a locking claw (27) formed at the leading end of each arm main body (26) and engageable with the corresponding engaging portion (32) of the mating connector (30).

8. A system of connectors, each said connector in said system being for connecting an optical fiber (A) to a mating connector (30), said mating connector (30) having a receptacle (31), said connectors in said system comprising identical housings (10), each said housing (10) having opposed front and rear ends, a ferrule (11) projecting forwardly from said front end, said front end being dimensioned for insertion into said receptacle (31) of said mating connector (30), each said housing (10) further including a friction lock projection (13) projecting outwardly on portions of said housing (10) in proximity to said front end thereof for pressing portions of the mating connector (30) defining the receptacle (31) to achieve a friction lock type of coupling of said housings (10) of said connector to said mating connector (30), each said connector (10) of said system further comprising a fixing member (20) dimensioned and configured to be fitted in the rear end of the housing (10) and having flexible retainers (22, 23) for securely holding the optical fiber cable (A) in the connector, selected fixing members (20) of said system further comprising deflectable locking arms (25) selectively engageable with engaging portions (32) formed on said mating connector (30) to achieve a full lock type of coupling of the connector to the mating connector.

* * * * *